(12) United States Patent
Färber

(10) Patent No.: US 6,527,337 B2
(45) Date of Patent: Mar. 4, 2003

(54) SLIDING ROOF COVER OF A MOTOR VEHICLE ROOF AND A MOTOR VEHICLE ROOF WITH MOVABLE SLIDING ROOF COVERS

(75) Inventor: Manfred Färber, Wielenbach (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/912,417

(22) Filed: Jul. 26, 2001

(65) Prior Publication Data

US 2002/0024238 A1 Feb. 28, 2002

(30) Foreign Application Priority Data

Jul. 27, 2000 (DE) .......................... 100 37 035

(51) Int. Cl.⁷ .................................. B60J 7/053
(52) U.S. Cl. ................... 296/222; 296/220.01; 296/223
(58) Field of Search ........................... 296/220.01, 222, 296/223

(56) References Cited

U.S. PATENT DOCUMENTS 4,364,601 A * 12/1982 Katayama et al. ...... 296/222 X
4,732,422 A * 3/1988 Schlapp et al. ......... 296/223 X
4,911,497 A * 3/1990 Schreiter et al. ............ 296/222
5,335,961 A 8/1994 Reinsch et al.
5,484,185 A 1/1996 Salz et al.
5,836,642 A 11/1998 Salz

FOREIGN PATENT DOCUMENTS

| DE | 30 38 353 | 4/1981 | |
|---|---|---|---|
| DE | 40 40 825 | 7/1992 | |
| DE | 40 05 790 | 10/1992 | |
| DE | 43 29 580 | 11/1994 | |
| DE | 44 27 442 | 12/1995 | |
| DE | 197 01 211 | 2/1998 | |
| DE | 197 13 347 | 5/1999 | |
| GB | 573355 | * 11/1945 | ............ 296/220.01 |

* cited by examiner

*Primary Examiner*—Dennis H. Pedder
(74) *Attorney, Agent, or Firm*—Nixon Peabody LLP; David S. Safran

(57) ABSTRACT

A sliding roof cover for selectively closing and at least partially opening a roof opening in a motor vehicle roof. The cover is movably supported by at least one bearing mechanism on a pair of longitudinal guides located on either side of the roof opening. Each bearing mechanism includes a crank mechanism which is movable relative to the cover for raising or lowering the cover, and a vertical guide on the longitudinal guide is assigned to the front edge or the rear edge of the cover, in which a cover guide element of the cover is supported for vertical movement.

34 Claims, 13 Drawing Sheets

SLIDING ROOF COVER OF A MOTOR VEHICLE ROOF AND A MOTOR VEHICLE ROOF WITH MOVABLE SLIDING ROOF COVERS

BACKGROUND OF THE INVENTION

1. Field of the Invention

The present invention is directed generally to a sliding roof cover for selectively closing or at least partially opening a roof opening in a motor vehicle roof, the cover being movably supported by a bearing mechanism on longitudinal guides which are located on either side of the roof opening. Further, the present invention is directed to a motor vehicle roof with a roof opening and at least two movable sliding roof covers for selectively closing or at least partially opening the roof opening, the covers being movably supported by a bearing mechanism on longitudinal guides located on both sides of the roof opening.

2. Description of Related Art

German Patent DE 30 38 353 C2 discloses a sliding roof arrangement for a motor vehicle roof in which a sliding roof cover in its forward area is supported by means of a slide block which is movably supported on a roof-mounted longitudinal guide. The guide pin of the slide block is movably held in a curved guide path which is made on the cover carrier. When the slide block is moved relative to the cover, the front area of the cover is raised or lowered. A vertical guide for the engagement part of the cover is movably supported on the longitudinal guide and can be fixed to it. The rear area of the cover can be raised or lowered via a lever arrangement which is guided in a linear guide path on the cover or is supported around a pivot.

SUMMARY OF THE INVENTION

A primary object of the present invention is to devise the initially-mentioned sliding roof cover with a bearing mechanism which is simplified and improved, and to devise a motor vehicle roof with at least two movable sliding roof covers which can at least partially open or close the roof opening in an improved sequence of motion.

This object is achieved by providing a sliding roof cover with the cover being movably supported by a bearing mechanism on longitudinally-extending guides which are located on either side of the roof opening, characterized in that the lateral bearing mechanism has a crank arrangement which is movable relative to the cover for raising or lowering the cover, and a vertical guide on the roof-mounted longitudinal guide assigned to the front or rear edge of the cover, whereby the cover guide element of the cover is supported for vertical movement.

The above object of the invention is further achieved in providing a motor vehicle roof with at least two movable sliding roof covers for selectively closing or at least partially opening a roof opening, the covers being movably supported by a bearing mechanism on longitudinally-extending guides located on either side of the roof opening, wherein at least one of the covers can be vertically lowered from a closed position and one section of the roof opening can be cleared by moving the lowered cover or the other cover into a stacked arrangement.

Due to the lateral bearing mechanism with the crank arrangement and the vertical guide, a mechanism is made available which reliably guides the cover on a vertical path without play and without movement in the horizontal direction, the mechanism having few moving parts. In this way, very narrow gaps between the cover and the rigid roof cover can be adjusted.

Preferably, a vertical guide carriage which contains the vertical guide and a bearing carriage which contains the crank arrangement are movably supported on the longitudinal guide, the bearing carriage being connected especially to a drive mechanism such as a drive cable. The drive cable is, for example, integrated on the longitudinal guide and is moved by a drive mechanism such as an electric drive motor located in front of or behind the roof opening.

Feasibly, the present invention may include a locking mechanism which keeps the vertical guide carriage for vertical guidance of the cover locked on the longitudinal guide and when the cover is lowered cancels the locking of the vertical guide carriage and couples it to the bearing carriage in order to enable their joint displacement. Thus, the locking mechanism provides for the required fixing of the vertical guide in the horizontal direction and in the closed position of the cover and also during lowering or raising. To move the cover, the locking mechanism releases the vertical guide carriage and couples it to the bearing carriage so that only this bearing carriage need be driven via the drive cable. Preferably, the locking mechanism is a locking block mechanism with a locking function which is activated by moving the bearing carriage.

In one preferred embodiment, the crank arrangement has a front and a rear guide path wherein each guide path has an upper section which is assigned to the closed position of the cover, a transition section which is tilted relative to the cover, and a lower section which is assigned to the lowered position of the cover. Engagement elements of the cover, thus, slide continuously in the guide paths so that for rounded transitions between the individual path sections a low-wear motion sequence without impact is possible.

When the front and the rear guide path are made essentially identical, the cover can be lowered and raised by an identical support arrangement in the guide paths in an alignment parallel to the longitudinal guide. On the other hand, the front and the rear guide path can also have upper and lower horizontal sections of unequal length so that the cover can be lowered by a dissimilar support arrangement in the guide paths into a tilted position and then into an alignment which is parallel to the longitudinal guide. In another embodiment, the cover is guided via fixed cover carriers on the guide paths.

According to another embodiment in accordance with the present invention, the cover is guided via one pivoting lever on the front and the rear guide path, each pivoting lever on the one hand being supported to be able to pivot on the cover in a pivot hinge and on the other hand being supported to pivot and move on the longitudinal guide of the vertical guide carriage or of the bearing carriage and one guide element of the pivoting lever being guided in the respective guide path. The combination of the guide path with the pivoting lever can yield a large lifting path with a small construction height in the lowered position of the cover.

Since the motor vehicle roof in accordance with the present invention has at least one of cover capable of being vertically lowered from its closed position and one section of the roof opening can be cleared by moving the lowered cover or the other cover into a stacked arrangement, great variability is achieved when the open positions of the motor vehicle roof are adjusted. In the stacked arrangement the two covers are located congruently on top of one another or are also partially shifted against one another.

Preferably, the motor vehicle roof contains three sliding roof covers, of which one cover can be moved in the roof opening without vertical lowering and the other two covers can be lowered vertically into different vertical positions so that at least two covers can be moved on top of one another into a stacked arrangement.

Another embodiment of the motor vehicle roof in accordance with the present invention calls for the front cover to have a vertical guide in the area of its front edge, for the middle cover to be movable in a fixed vertical position and for the rear cover to have a vertical guide in the area of its rear edge.

DETAILED DESCRIPTION OF THE INVENTION

Figure 1:
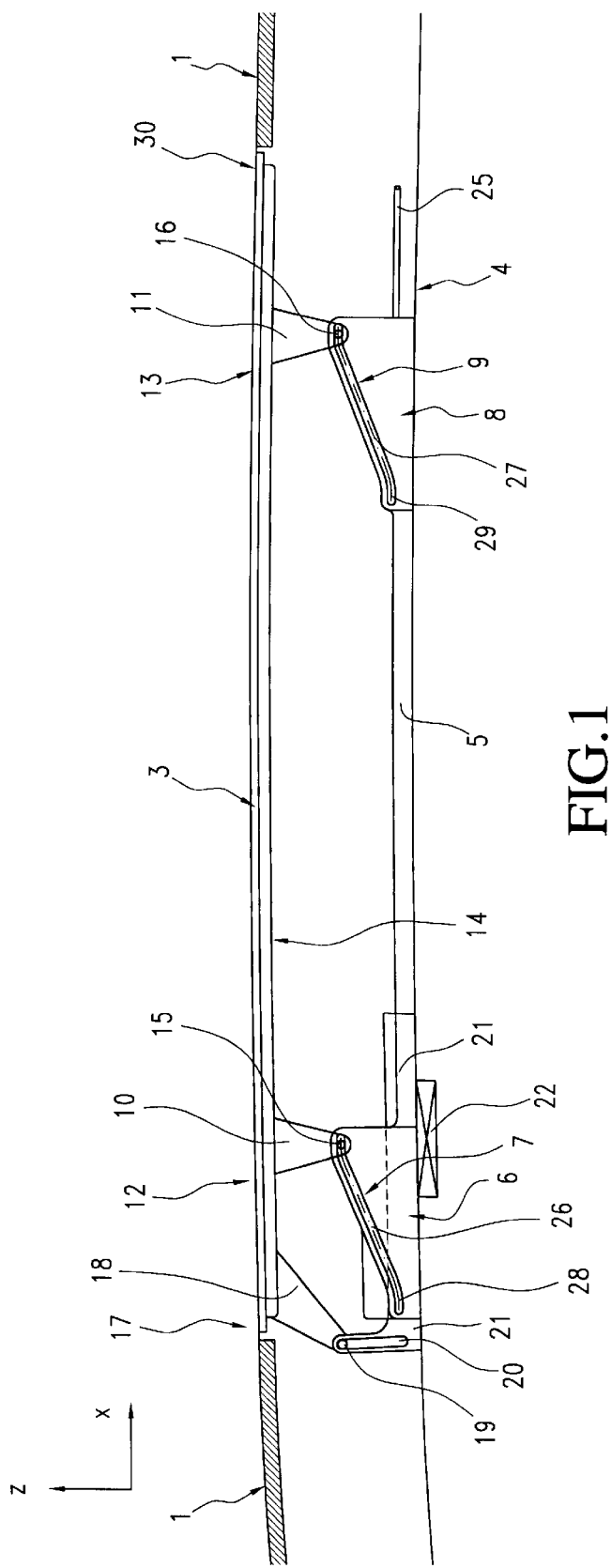
FIG. 1 is a longitudinal sectional view of a first embodiment of the movable cover in the closed position of an openable motor vehicle roof.
Figure 2:
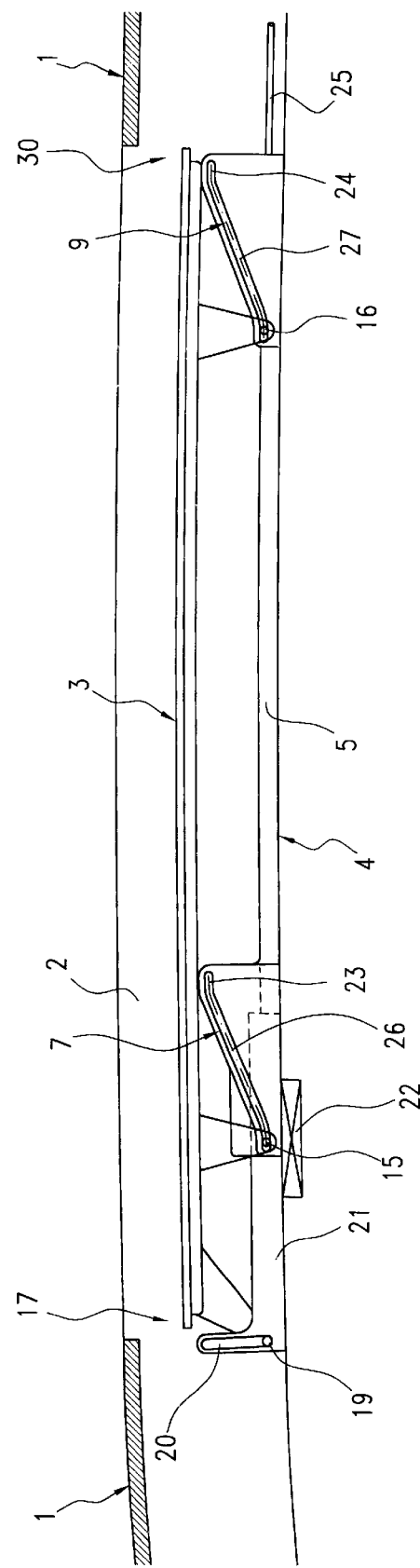
FIG. 2 shows the cover of FIG. 1 in the lowered position.

As illustrated in FIGS. 1 & 2, a motor vehicle roof includes a roof opening 2 which is located in a fixed roof cover 1 and a movably supported cover 3 for closing (FIG. 1) and at least partially clearing (see FIG. 2) the roof opening 2. Mounted laterally of the roof opening 2 on the roof frame is a guide rail 4 on which a bearing carriage 5 for the cover 3 is movably held. The bearing carriage 5 includes a front cover guide 6 with a front guide path 7 which rises in the longitudinal direction from the front to the back and a rear cover guide 8 with a correspondingly formed rear guide path 9. A front and a rear cover carrier 10, 11 which projects downward in the front section 12 and the rear section 13 of the cover 3 on the cover bottom 14 each contains a bearing element 15, 16 which is movably held in the front and the rear guide path 7, 9 of the front and rear cover guides 6, 8. The bearing element 15, 16 is, for example, a journal, a pin or a bearing shoe which projects transversely from the cover carrier 10, 11 and which is held in the guide path 7, 9.

An additional cover carrier 18 is attached to the front edge 17 of the cover 3 and extends downward from the cover 3. On the bottom end of the cover carrier 18 is a vertical guide pin 19 which is movably held in a linear vertical guide 20. The linear vertical guide 20 is made or attached to a vertical guide carriage 21 which is supported for horizontal movement on the guide rail 4. By way of the schematically shown locking block mechanism 22 which is located on the guide rail 4 in the area of the vertical guide carriage 21 and the front cover guide 6 (with the cover closed as shown in FIG. 1), the vertical guide carriage 21, on the one hand, can be fixed against displacement on the guide rails 4 and on the other can be coupled to the bearing carriage 5 for joint movement. Examples of such a locking block mechanism 22 are described in detail, for example, in U.S. Pat. Nos. 5,335,961; 5,484,185; and 5,836,642, and German Patents DE 43 29 580 C1 and DE 44 27 442 C1 so that a detailed explanation is not necessary due to the express reference to these disclosures.

As shown in FIG. 1, the cover 3 in its closed position is located flush to the roof cover 1. Here, the vertical guide pin 19 of the cover 3 is located on the top end of the vertical guide 20 and the front and the rear cover carrier pins 15, 16 are located on the top horizontal section 23 and 24 of the respective guide path 7, 9.

As shown in FIG. 2, to lower the cover 3, the bearing carriage 5 is pushed via a drive cable 25 (shown schematically) of a drive means along the guide rail 4 to the rear (in the x direction). Since the vertical guide carriage 21 is maintained in a blocked position via the locking block mechanism 22 on the guide rail 4, the cover 3 is fixed in the longitudinal direction by way of the vertical guide pin 19, whereas the cover carrier pins 15, 16 which are shifted in a central tilted section 26, 27 of the guide path 7, 9 reach the lower level in a lower horizontal section 28, 29. Thus, the cover 3 has been uniformly lowered vertically (in the z direction) while maintaining its essentially horizontal alignment which is parallel to the guide rail 4 as a result of the identical configuration of the two guide paths 7, 9 and of the engagement of the vertical guide pin 19 in the vertical guide 20. In the longitudinal direction along the guide rail 4, the cover 3 does not change its position. The front edge 17 of the cover and the rear edge 30 of the cover, thus, move vertically downward.

With the cover 3 in the lowered position, the locking block mechanism 22 releases the blocking of the vertical guide carriage 21 on the guide rail 4 and couples the vertical guide carriage 21 to the bearing carriage 5 when the bearing carriage 5 is pushed further. Via the drive cable 25, the coupled unit including the bearing carriage 5, the vertical guide carriage 21 and the lowered cover 3 can be moved further to the rear, for example, to a position underneath the fixed roof cover 1 into the open position. Instead of the fixed roof cover 1, another movable cover can be connected to the cover 3 and the cover 3 can be pushed underneath the other movable cover.

The opposite sequence of motions guides the cover 3 back again into its closed position as shown in FIG. 1, the locking block mechanism 22 fixing the vertical guide carriage 21 at its position which is intended for vertical guidance of the cover 3 on the guide rail 4 and cancels the rigid coupling to the bearing carriage 5. Fixing the pitch of the tilted section 26, 27 of the guide path 7, 9 makes it possible to set the desired transfer of motion and force. The vertical guide 20 exactly fixes the position of the cover 3 in the x direction. Instead of a bearing carriage 5 which contains the front and the rear cover guide 6, 8, the two cover guides 6, 8 can also be made as independent units which are supported on the guide rail 4 and which are rigidly coupled to one another for transfer of motion when moved longitudinally.

Figure 8:
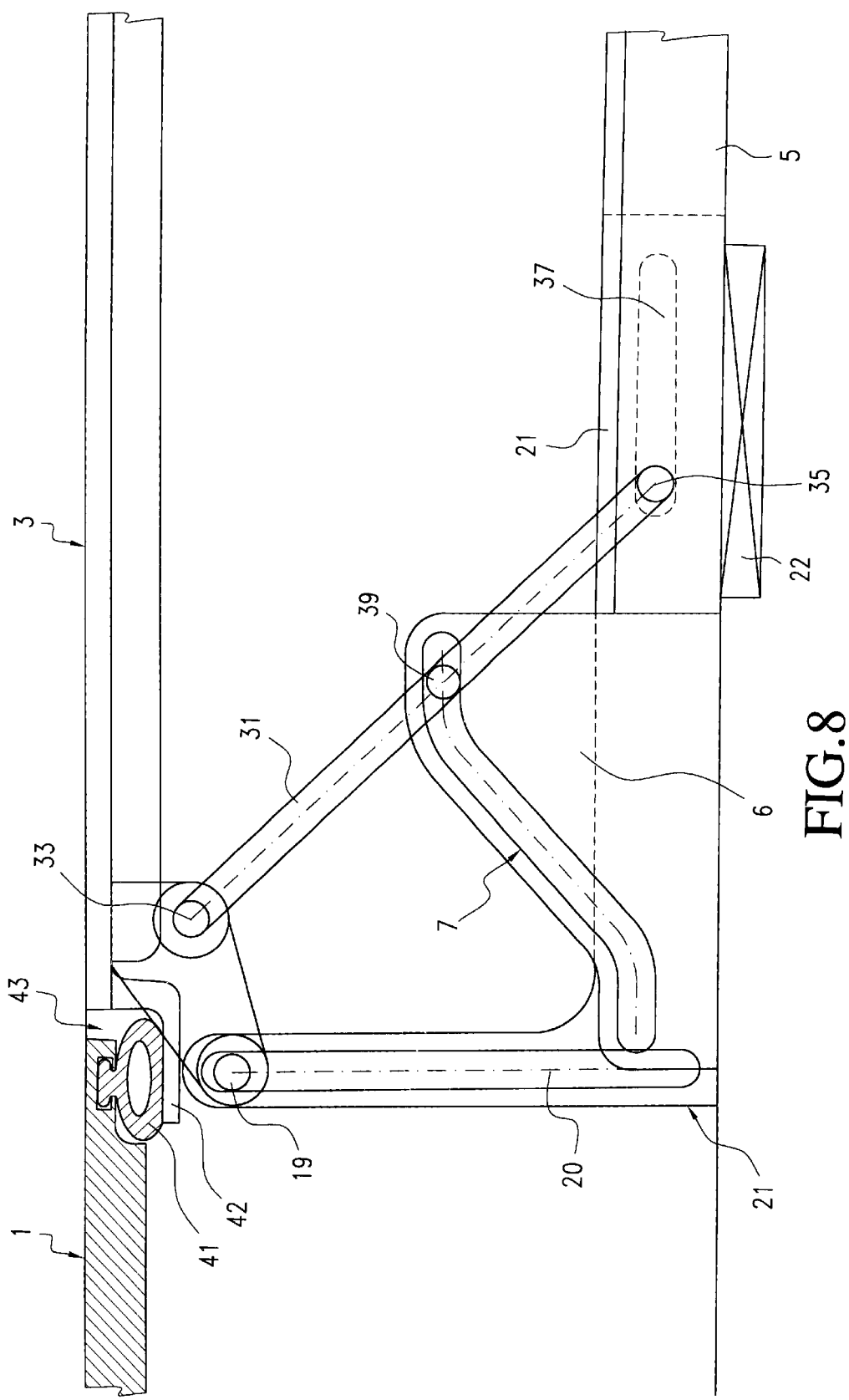
FIG. 8 is an enlarged representation of the front bearing means for the position of the cover shown in FIG. 6.

As shown in FIG. 8, the kinematics of the described components ensures relatively great transfer of force when the roof opening is closed and when the cover 3 is pressed against a seal, especially against a seal which extends underneath, and a soft sequence of motion corresponding to the run of the curve of the guide paths 7, 9.

Figure 3:
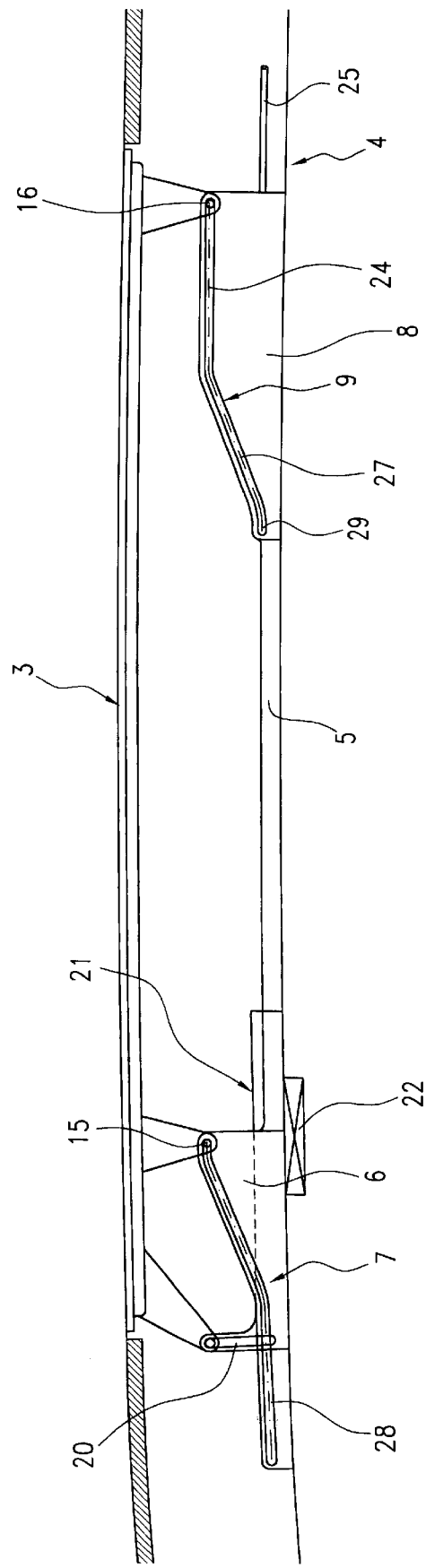
FIG. 3 is a longitudinal sectional view a second embodiment of the movable cover in the closed position of an openable motor vehicle roof.
Figure 4:
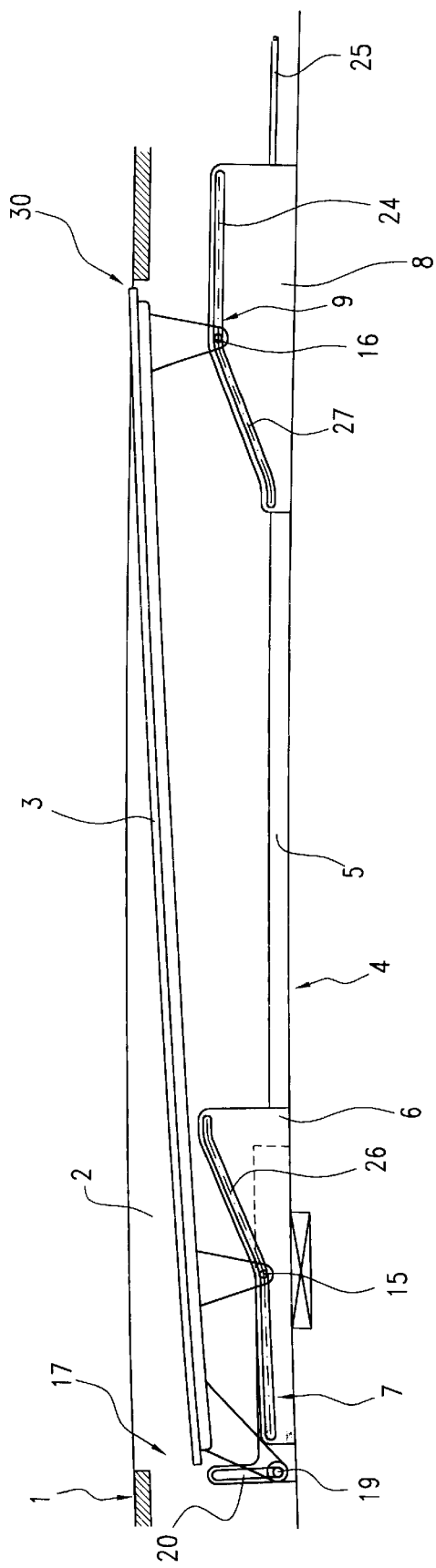
FIG. 4 shows the cover of FIG. 3 with the front edge lowered.
Figure 5:
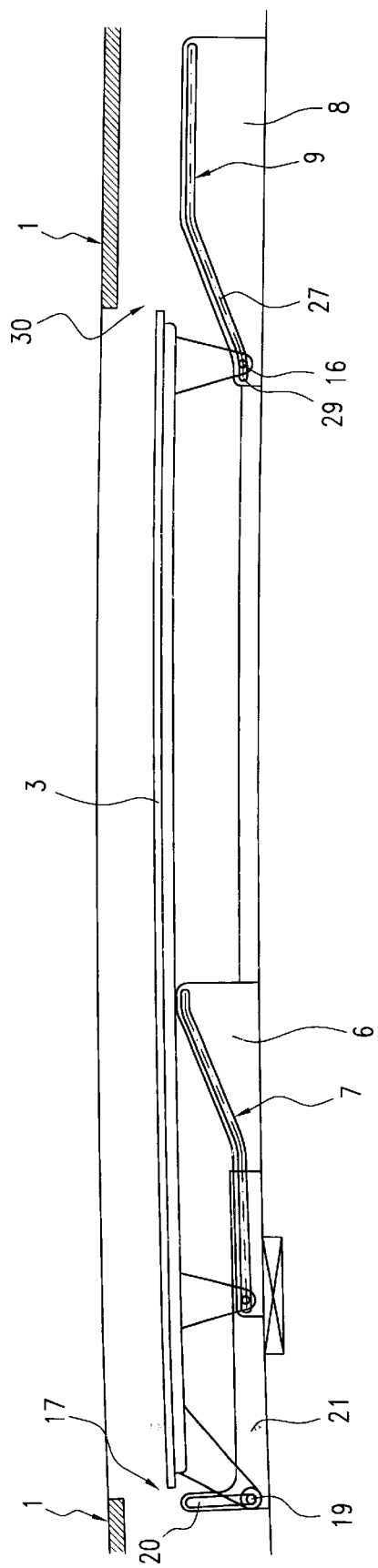
FIG. 5 shows the cover of FIG. 4 in the lowered position.
Figure 6:
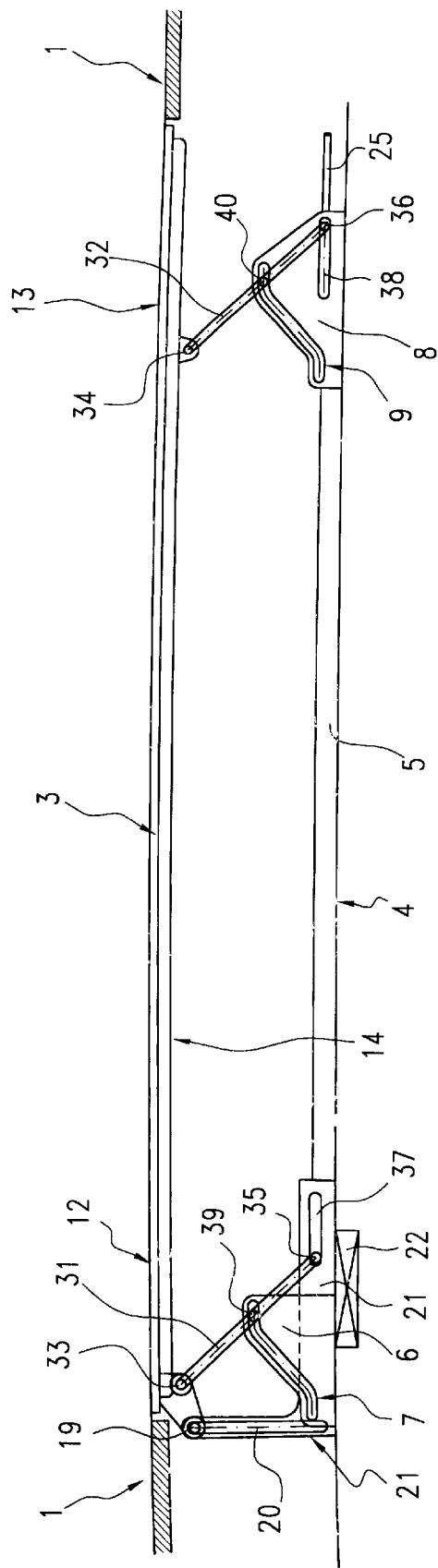
FIG. 6 is a longitudinal sectional view another embodiment of the movable cover with a modified bearing means in the closed position.
Figure 7:
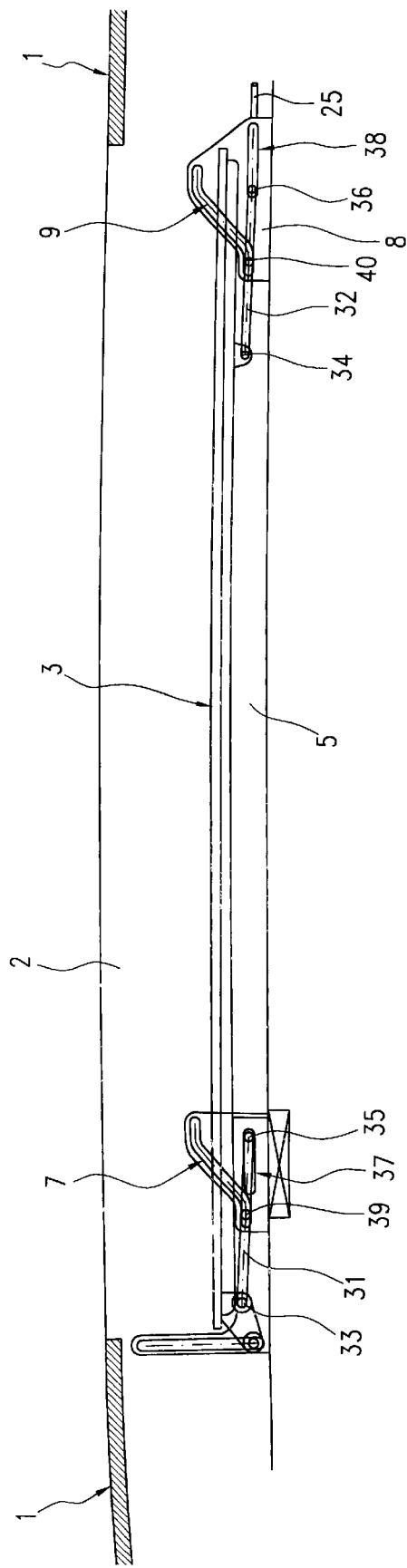
FIG. 7 shows the cover of FIG. 6 in the lowered position.

As shown in FIGS. 3 through 5, in a second embodiment with otherwise identical structure, the top horizontal section 24 of the rear guide path 9 and the lower horizontal section 28 of the front guide path 7 are elongated. With initial displacement of the bearing carriage 5 out of the closed position of the cover 3 the front cover guide pin 15 slides on the downwardly tilted section 26 of the front guide path 7 as far as the start of the horizontal lower section 28 of the front guide path 7, while the rear cover guide pin 16 is still on the upper horizontal section 24 of the rear guide path 9 (see FIG. 4). In this way, the tilted position of the cover 3 with the front edge 17 lowered is adjusted and forms a ventilation position for ventilating the interior of the motor vehicle.

As the bearing carriage 5 continues to move along the guide rail 4 to the rear, the rear cover guide pin 16 is also lowered into the short lower horizontal section 29 of the guide path 9 so that the rear edge 30 of the cover 3 is also lowered and has assumed an alignment which is roughly parallel to the guide rail 4 or the roof cover 1 (see FIG. 5). According to the first embodiment, the cover 3 in this lowered position can be pushed forward or backward along the guide rail 4 via the driven bearing carriage 5 after the locking block mechanism 22 has decoupled the vertical guide carriage 21 from the guide rail 4 and has coupled it to the bearing carriage 5.

In another embodiment shown in FIGS. 6 through 9, the cover 3 is movably supported according to the preceding embodiments via the vertical guide pin 19 located on the front edge 17 of the cover in the vertical guide path 20 which has a greater vertical length than in the preceding embodiments. To lower and raise the cover 3, a front and a rear pivoting lever 31, 32 in the front pivot hinge 33 are coupled to the front section 12 or in the rear pivot hinge 34 on the rear section 13 of the cover 3 to the bottom 14 of the cover. The opposite end of each pivoting lever 31, 32 contains a horizontal guide pin 35, 36 which is horizontally held movably for the front pivoting lever 31 in the front horizontal guide 37 which is adjacent to the guide path 7 and which is formed in the vertical guide carriage 21, and for the rear pivoting lever 32 in the rear horizontal guide 38 which is adjacent to the rear guide path 9. Between its two ends each pivoting lever 31, 32 contains a cover guide pin 39 and 40 which fits into the respective guide path 7 and 9 and which is guided to be able to move in it.

When the cover 3 is in its closed position in the roof opening 2 (see FIG. 6), the pivoting levers 31, 32 are pivoted relative to the horizontal, the cover guide pins 39, 40 being located in the upper horizontal sections 23, 24 of the guide paths 7, 9. In this position, the pivoting levers 31, 32 are blocked against pivoting and keep the cover 3 fixed in the roof opening 2. The locking block mechanism 22 keeps the vertical guide carriage 21 locked on the guide rail 4.

To lower the cover 3, the bearing carriage 5 is pushed to the rear by way of the drive cable 25. In doing so, the cover guide pins 39, 40 of the two pivoting levers 31, 32 slide in the tilted sections 26, 27 of the guide paths 7, 9 downwardly. Since the cover 3 in the vertical guide 20 is secured against horizontal displacement, the guide paths 7, 9 pull the respective cover guide pins 39, 40 downward, the pivoting levers 31, 32 pivoting about their back ends in the horizontal guides 37, 38 and being pushed therein to balance the length, and the front pivoting supports 33, 34 being guided down on a vertical path of motion. When the bearing carriage 5 has been pushed to the rear by a path such that the cover guide pins 39, 40 are located in the lower horizontal section 28, 29 of the guide paths 7, 9, the pivoting levers 31, 32 are essentially horizontal or parallel to the guide rail 4 and the cover 4 is in its bottom lowered position (see FIG. 7). At this point, as has already been described, by way of the locking block mechanism 22 the vertical guide carriage 21 can be de-coupled from the guide rail 4 and coupled to the bearing carriage 5 so that as the driving motion continues the cover 3 can be pushed with its bearing carriage along the guide rail 4.

The pivoting levers 31, 32 allow a comparatively large vertical lifting path of the cover 3 with little horizontal displacement of the bearing carriage 5 and enable a great lifting height and lowering of the cover 3 to a lower level at a comparatively small construction height as compared to the first embodiment (see FIG. 2).

Due to the different lengths of the top and bottom horizontal sections 23, 24 and 28, 29 of the guide paths 7, 9, according to the already described embodiment the front lowered ventilation position can be adjusted with the cover 3 tilted.

Figure 9:
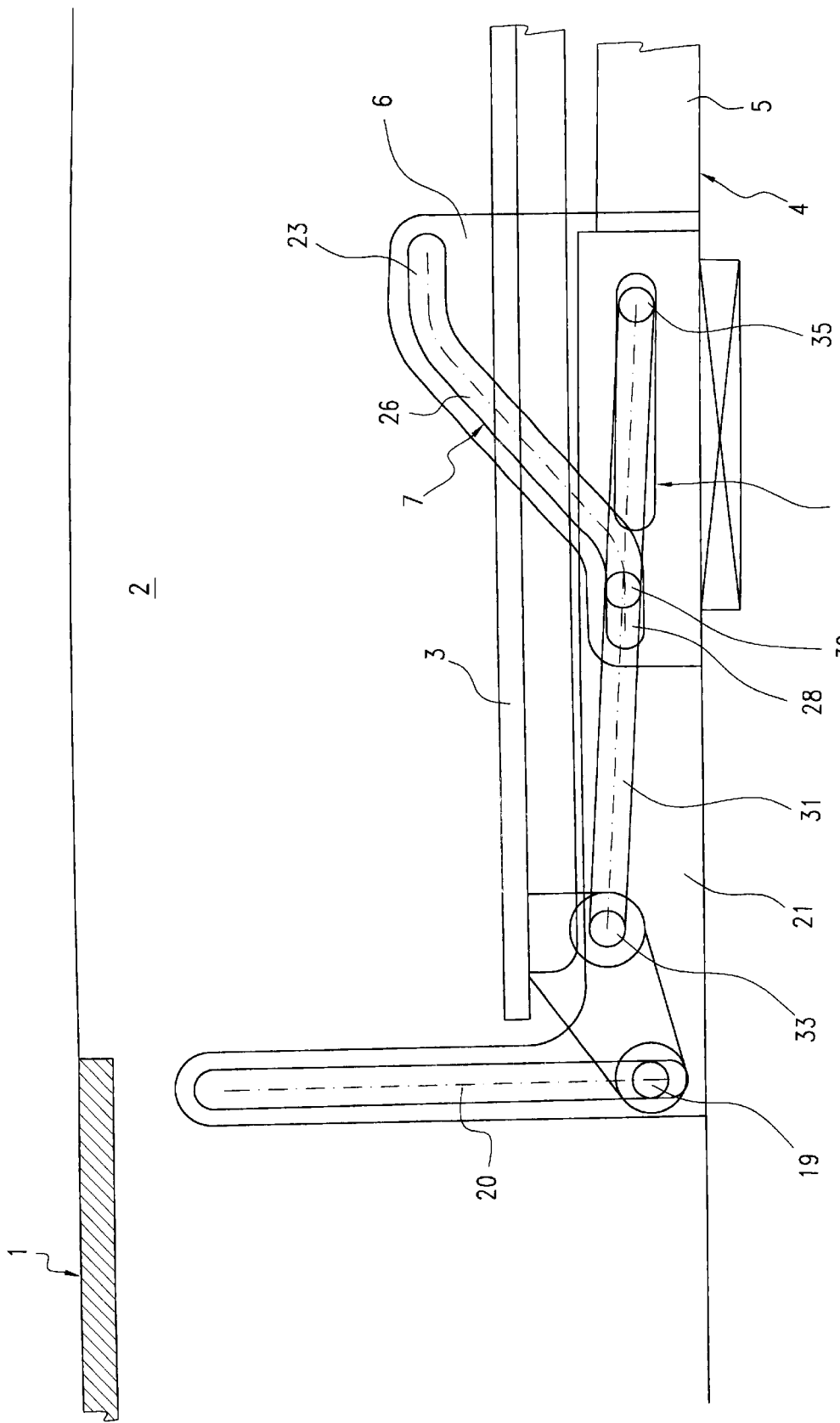
FIG. 9 is view corresponding to that of FIG. 8 but with the front bearing mechanism in the position for when the cover is in the lowered position.

FIGS. 8 & 9 show the front and the rear cover guide 6 and 8 enlarged. FIG. 8 shows the cover seal 41 under which the cover 3 extends, by way of example. The cover 3 is sealed relative to the roof cover 1 or another fixed or movable roof part when the cover 3 is raised, when the cover projection 42 from underneath adjoins the cover seal 41. Relative sliding motion between the cover 3 and the seal 41 does not take place. The compressed seal 41 cannot be pressed against the roof surface through a gap 43 between the cover 3 and the roof cover 1, as can occur in the seals located in the gap 43.

Figure 10:
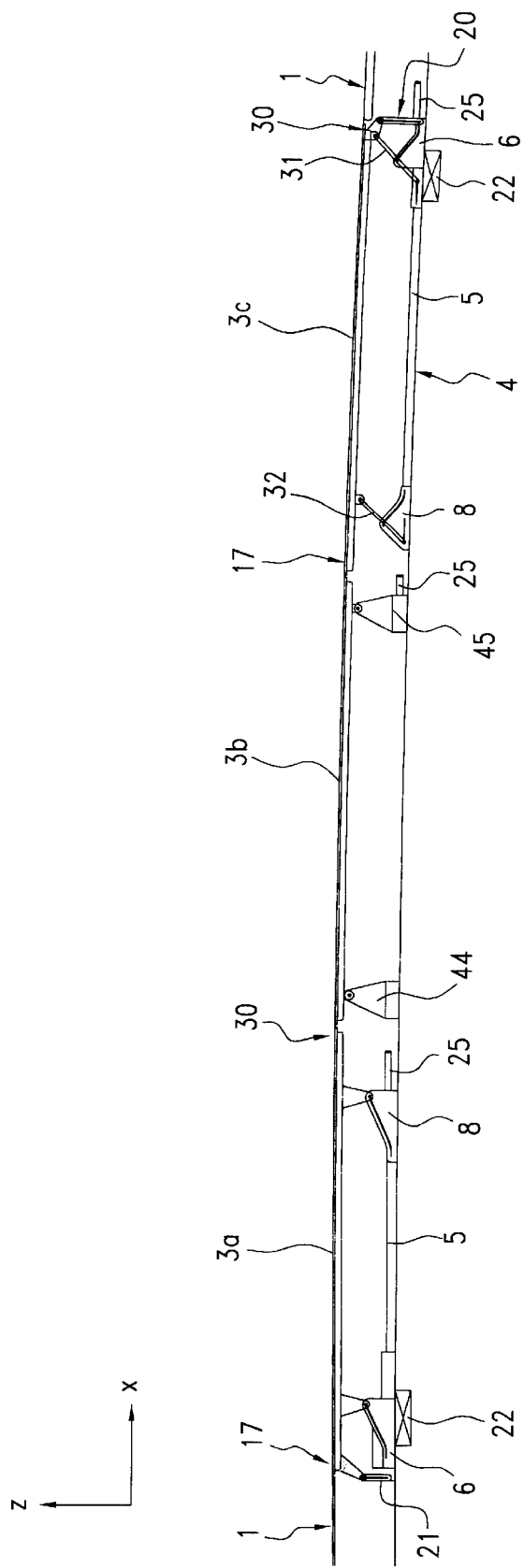
FIG. 10 is a longitudinal sectional view a motor vehicle roof with three movable covers.

FIG. 10 shows a motor vehicle roof with a comparatively long roof opening which can be closed and cleared by three covers 3a, 3b, and 3c. The front or first cover 3a contains a bearing means according to the first embodiment which allows lowering of the first cover 3a into a first or middle plane underneath the level of the roof cover 1.

The second or middle cover 3b is movably supported on the guide rail 4 via the cover carriers 44 and 45 which do not allow vertical adjustment of the cover 3b. These cover supports 44, 45 are, for example, attached to the bottom of the cover and are movably supported via sliding carriages on the guide rail 4.

Figure 11:
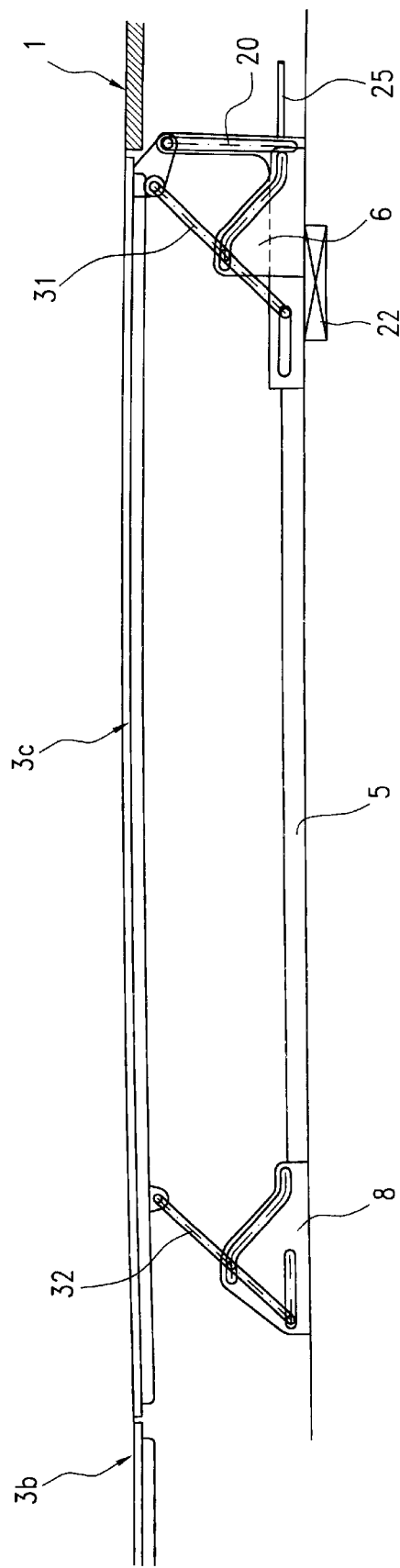
FIG. 11 is a longitudinal sectional view of the rear cover of the motor vehicle roof of FIG. 10 in the closed position.
Figure 12:
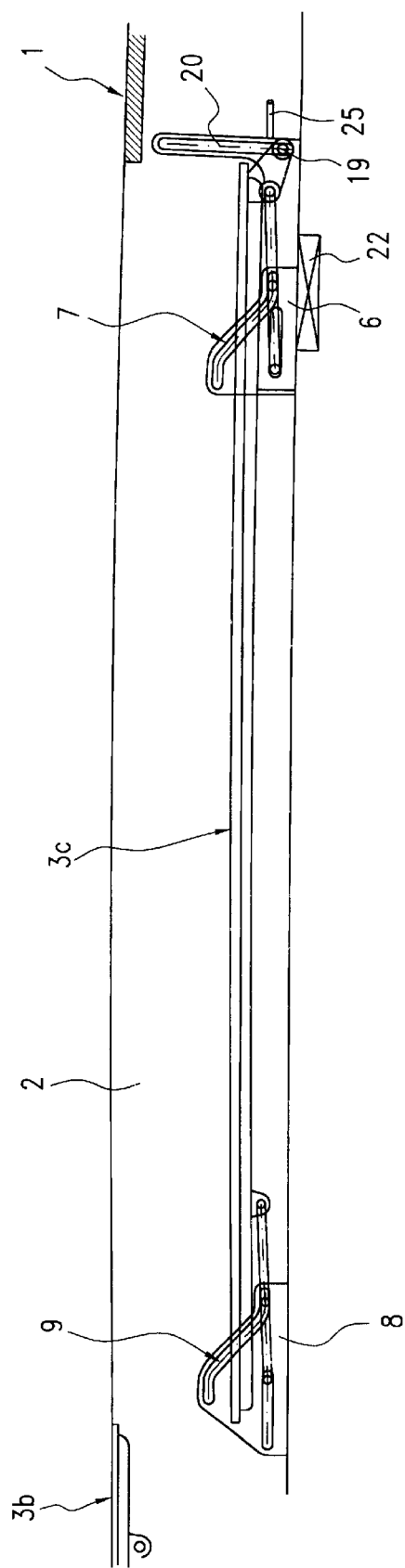
FIG. 12 is a view as shown in FIG. 11 but with the rear cover in the lowered position.
Figure 13:
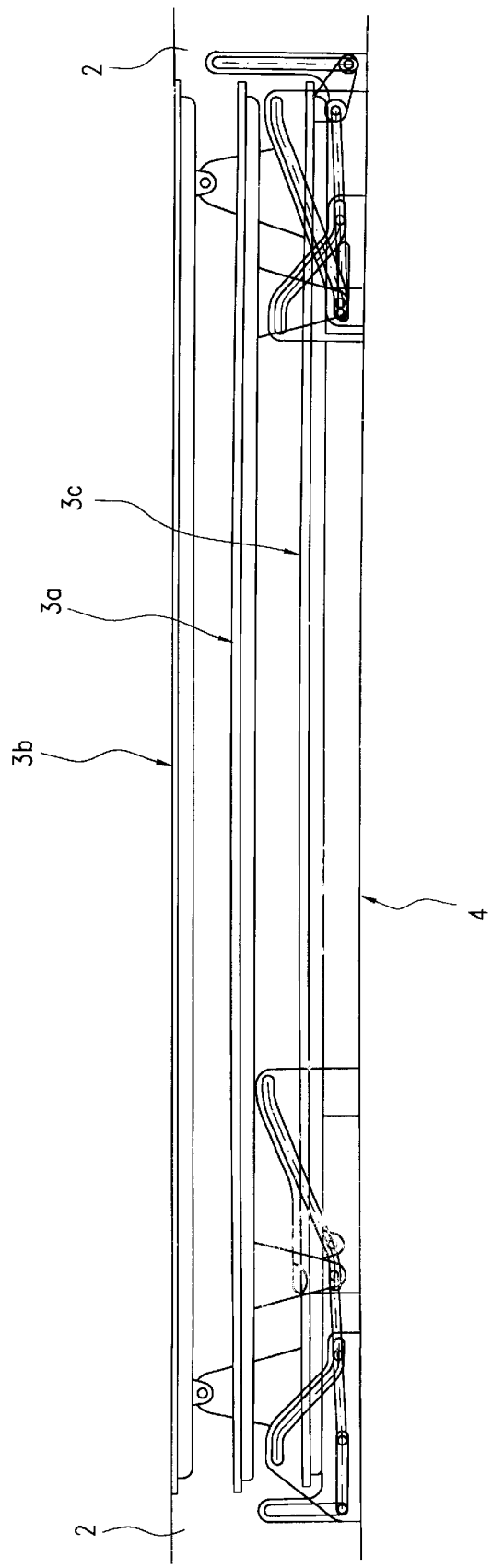
FIG. 13 is a longitudinal sectional view of the three covers of the motor vehicle roof of FIG. 11 in an arrangement on top of one another.

As shown in FIGS. 11 and 12, the third or rear cover 3c contains a bearing means of the type described previously, but which is formed in the reverse arrangement with a vertical guide 20 which is attached to the rear edge 30 of the cover. This bearing means enables vertical lowering of the third cover 3c into a second or lower plane (FIGS. 12 & 13). Of course, the bearing means of the three covers 3a, 3b, and 3c are arranged offset on the guide rail 4 in the transverse direction such that the three covers 3a, 3b and 3c can be pushed past one another. Each cover is connected via its lateral bearing means to the drive cable 25. Thus, for example, there are three drive motors on the motor vehicle roof, of which one pair of drive cables at a time runs to each of the covers.

To adjust the tilted ventilator position, there can be bearing means with lowering of the front edge 17 of the cover or the rear edge 30 of the cover for the first cover 3a and for the third cover 3c. Each cover 3a, 3b and 3c can be driven independently via the drive cable 25 which is located laterally on each guide rail 4. Thus, independently of one another, the first cover 3a can be moved into the ventilator position or can be vertically lowered and can be pushed out of its lowered position to the rear to under the second cover 3b. Accordingly, the third cover 3c can be lowered into the lower plane and can be moved under the second cover 3b. If the first cover 3a is already located under the second cover 3b, the third cover 3c also moves under the first cover 3a.

The covers 3a, 3b and 3c which are located on top of one another can be pushed as a totality so that with the roof opening 2 opened, for example, each cover 3a, 3b and 3c is located in the rear part, in the middle or in the front part of the roof opening 2. In this way, a variable, large roof system is made available which contains at least two covers and preferably three covers. The front edge 17 of the cover can be lowered for ventilation of the motor vehicle interior on the front or the rear cover 3a, 3c.

Instead of the locking block mechanism, in each embodiments there can also be other interlocking means for fixing the vertical guide carriage 21 and for coupling the vertical guide carriage 21 to the bearing carriage 5. In general, the covers which can have the same or different bearing means, in their closed position can be located in any sequence in the roof opening 2. The bearing means can be supported in the reverse, modified arrangement on the guide rail 4. The vertically-invariable cover can thus also be the rear or the front cover.

While various embodiments in accordance with the present invention have been shown and described, it is understood that the invention is not limited thereto. These embodiments may be changed, modified and further applied by those skilled in the art. Therefore, this invention is not limited to the details shown and described previously but also includes all such changes and modifications which are encompassed by the appended claims.

What is claimed is:

1. A sliding roof cover for selectively closing and at least partially opening a roof opening in a motor vehicle roof, said cover comprising:
   a cover;
   at least one longitudinal guide mechanism having longitudinal guides mounted adjacent to the roof opening;
   bearing means for movably supporting said cover on said longitudinal guides, said bearing means including a raising and lowering mechanism for selectively raising or lowering the cover with respect to the roof opening; and
   a vertical guide mounted on said longitudinal guide mechanism, said vertical guide being connected to at least one of a front edge and a rear edge of the cover, wherein said cover includes a guide element which enables said cover to move vertically in said vertical guide with respect to the roof opening; and wherein said raising and lowering mechanism comprises a front guide path and a rear guide path, each of which is movable relative to the cover for selectively raising and lowering the cover.

2. The sliding roof cover as claimed in claim 1, further comprising a vertical guide carriage which contains the vertical guide and a bearing carriage which contains the raising and lowering mechanism, said vertical guide carriage and said bearing carriage being movably supported on said longitudinal guide mechanism.

3. The sliding roof cover as claimed in claim 2, wherein said bearing carriage is connected to a drive means.

4. The sliding roof cover as claimed in claim 3, wherein said drive means is a drive cable.

5. The sliding roof cover as claimed in claim 3, further comprising a locking means for locking the vertical guide carriage on the longitudinal guide mechanism.

6. The sliding roof cover as claimed in claim 5, wherein the lowering of the cover causes said locking means to discontinue the locking of the vertical guide carriage and thereby couple the vertical guide carriage to the bearing carriage in order to enable the joint displacement of the vertical guide carriage to the bearing carriage.

7. The sliding roof cover as claimed in claim 6, wherein the locking means comprises a locking block mechanism, said locking block mechanism having a locking function which is activated by movement of the bearing carriage.

8. The sliding roof cover as claimed in claim 1, wherein each of said front and rear guide paths have an upper section in which said cover rests while in a closed position, a transition section which is inclined relative to the cover, and a lower section in which said cover rests while in at least an open position.

9. The sliding roof cover as claimed in claim 8, wherein said cover is selectively movable in said front guide path and said rear guide path and in an alignment which is substantially parallel to the longitudinal guide mechanism.

10. The sliding roof cover as claimed in claim 8, wherein said front guide path and said rear guide path includes upper and lower horizontal sections of unequal length such that the cover can be selectively movable downwardly in said front guide path and said rear guide path into an inclined position and then into an alignment which is substantially parallel to the longitudinal guide mechanism.

11. The sliding roof cover as claimed in claim 10, wherein the cover is guided for selective movement in said front guide path and said rear guide path via a pair of fixed cover carriers.

12. The sliding roof cover as claimed in claim 8, wherein the cover is guided for selective movement in said front guide path and said rear guide path via a pair of pivoting levers, each of said pivoting levers being supported for pivotal movement in a pivot hinge and being supported for pivotal and sliding movement on the longitudinal guide mechanism and the bearing carriage.

13. The sliding roof cover as claimed in claim 12, wherein said pivoting levers include a guide element which enables movement of said pivoting levers in a respective guide path.

14. The sliding roof cover as claimed in claim 13, further comprising a seal under which a cover projection extends and is sealed when the cover is in the closed position.

15. A motor vehicle roof with a roof opening, said motor vehicle roof comprising:
   at least two movable sliding roof covers for selectively closing and at least partially opening the roof opening;
   at least one longitudinal guide mechanism having longitudinal guides mounted adjacent to the roof opening; and
   bearing means for movably supported the covers on the longitudinal guides,
   wherein at least one of the covers is movable from a closed position to a vertically lowered position, and
   wherein a section of the roof opening is cleared by moving the covers into a stacked position.

16. The motor vehicle roof as claimed in claim 15, wherein said roof comprises three sliding roof covers.

17. The motor vehicle roof as claimed in claim 16, wherein one of said three sliding roof covers is movable in the roof opening without vertical lowering and the other two covers are movable into different vertical positions so that at least two of the covers can be moved on top of the third cover into said stacked position.

18. The motor vehicle roof as claimed in claim 17, further comprising a vertical guide mechanism mounted on said longitudinal guide mechanism, said vertical guide mechanism being connected to at least one of a front edge and a rear edge of the cover.

19. The motor vehicle roof as claimed in claim 18, wherein at least one of said covers includes a guide element which permits a respective cover to move vertically in said vertical guide mechanism with respect to the roof opening.

20. The motor vehicle roof as claimed in claim 18, further comprising a vertical guide carriage which includes the vertical guide mechanism and a bearing carriage which includes a raising and lowering mechanism, said vertical guide carriage and said bearing carriage being movably supported on said longitudinal guide mechanism.

21. The motor vehicle roof cover as claimed in claim 20, wherein said bearing carriage is connected to a drive means.

22. The motor vehicle roof cover as claimed in claim 21, wherein said drive means is a drive cable.

23. The motor vehicle roof cover as claimed in claim 22, further comprising a locking means for locking the vertical guide carriage on the longitudinal guide mechanism.

24. The motor vehicle roof cover as claimed in claim 23, wherein the lowering of the cover causes said locking means to discontinue the locking of the vertical guide carriage to thereby couple the vertical guide carriage to the bearing carriage in order to permit the joint displacement of the vertical guide carriage to the bearing carriage.

25. The motor vehicle roof cover as claimed in claim 24, wherein the locking means comprises a locking block mechanism, said locking block mechanism having a locking function which is activated by movement of the bearing carriage.

26. The motor vehicle roof cover as claimed in claim 25, wherein the guide mechanism includes a front guide path and a rear guide path, each of said front and rear guide paths have an upper section in which said cover rests while in a closed position, a transition section which is inclined relative to the cover, and a lower section in which said cover rests while in at least an open position.

27. The motor vehicle roof cover as claimed in claim 26, wherein said at least one cover is selectively movable in said front guide path and said rear guide path and in an alignment which is substantially parallel to the longitudinal guide mechanism.

28. The motor vehicle roof cover as claimed in claim 26, wherein said front guide path and said rear guide path includes upper and lower horizontal sections of unequal length such that said at least one cover can be selectively movable downwardly in said front guide path and said rear guide path into a tilted position and then into an alignment which is substantially parallel to the longitudinal guide mechanism.

29. The motor vehicle roof cover as claimed in claim 28, wherein said at least one cover is guided for selective movement in said front guide path and said rear guide path via a pair of fixed cover carriers.

30. The motor vehicle roof cover as claimed in claim 28, wherein said at least one cover is guided for selective movement in said front guide path and said rear guide path via a pair of pivoting levers, each of said pivoting levers being supported for pivotal movement in a pivot hinge and being supported for pivotal and sliding movement on the longitudinal guide mechanism of the vertical guide carriage or of the bearing carriage.

31. The motor vehicle roof cover as claimed in claim 30, wherein said pair of pivoting levers includes a guide element which enables movement of said pivoting levers in a respective guide path.

32. The motor vehicle roof cover as claimed in claim 31, further comprising a seal under which a cover projection extends and is sealed when the cover is in the closed position.

33. The motor vehicle roof as claimed in claim 32, wherein a front cover of said three covers has a vertical guide adjacent to a front edge of the front cover.

34. The motor vehicle roof as claimed in claim 33, wherein a middle cover of said three covers is movable in a fixed vertical position and a rear cover of said three covers has a vertical guide adjacent to a rear edge of the rear cover.

* * * * *